Dec. 5, 1967 M. BOBO 3,356,340
TURBINE ROTOR CONSTRUCTIONS
Filed March 15, 1965 2 Sheets-Sheet 1
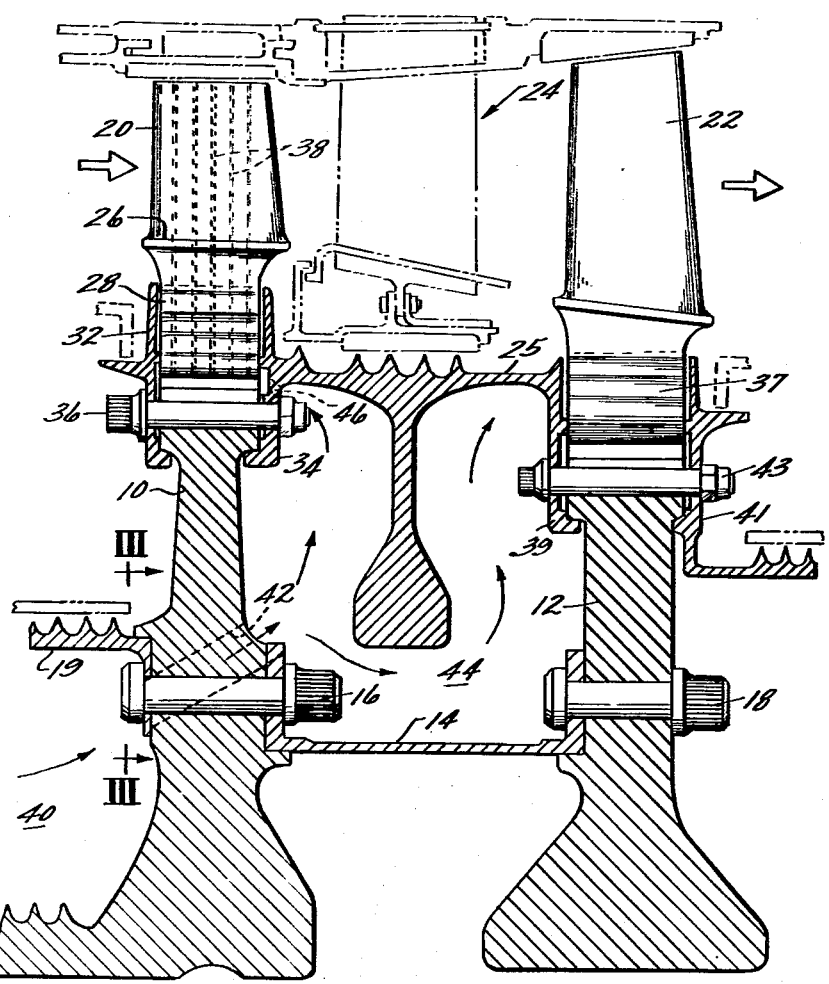
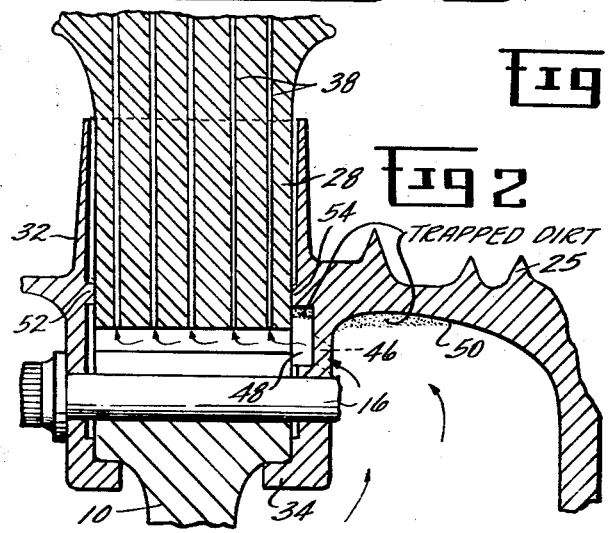
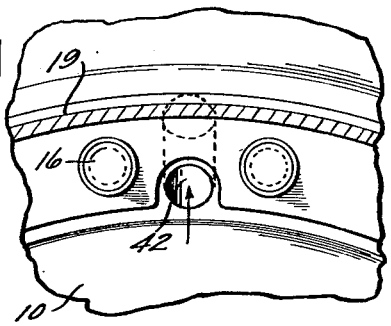
INVENTOR.
MELVIN BOBO
BY
ATTORNEY

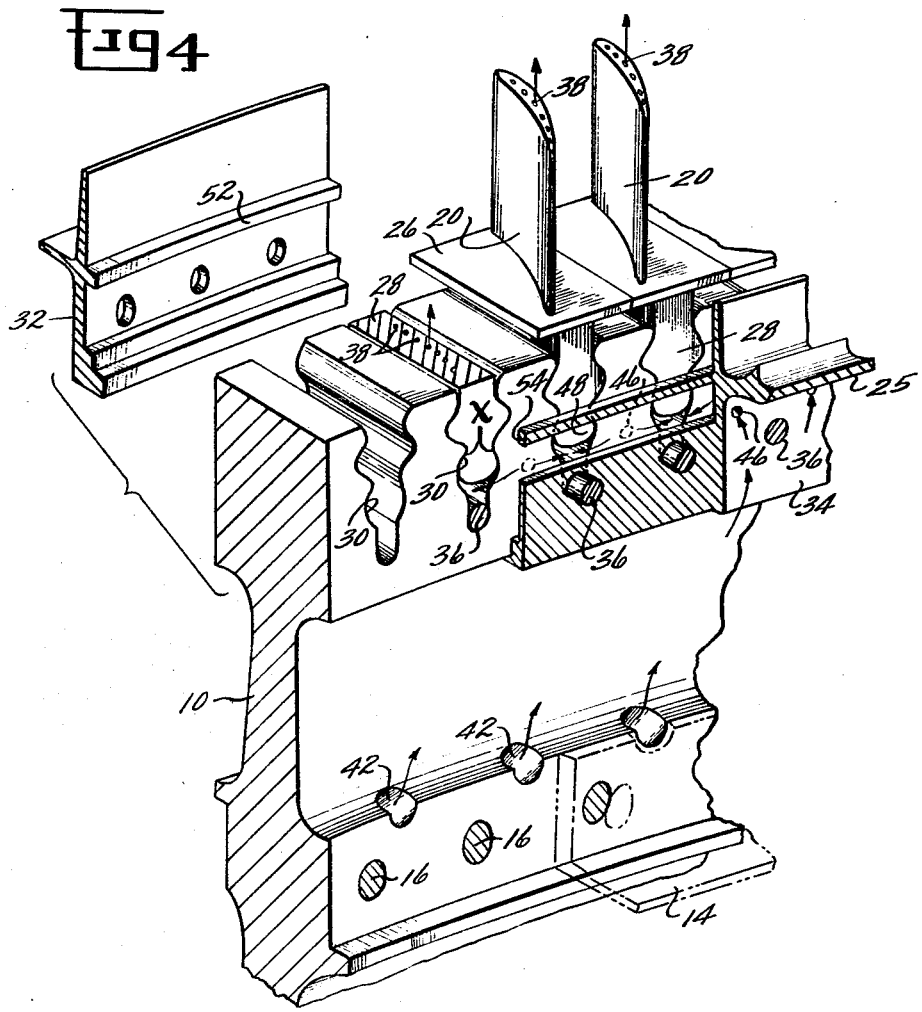

United States Patent Office 3,356,340
Patented Dec. 5, 1967

3,356,340
TURBINE ROTOR CONSTRUCTIONS
Melvin Bobo, Topsfield, Mass., assignor to General Electric Company, a corporation of New York
Filed Mar. 15, 1965, Ser. No. 439,900
3 Claims. (Cl. 253—39.15)

The present invention relates to improvements in turbine rotor constructions and more particularly to improved means for cooling the turbine blades or buckets.

Present gas turbine engine design involves the use of extremely high temperatures in order to generate the power requirements demanded, as in aircraft applications where a low rate of fuel consumption and/or a high thrust to weight ratio are paramount factors. Not only has this led to the development of metal alloys which are resistant to such extreme temperatures, but further to the use of air cooling means for reducing the temperatures of turbine rotor buckets or blades in order to obtain reasonable operating life when subject to such high temperatures. It will, of course, be apparent that the cooling of these turbine buckets is quite important and even relatively small reductions in cooling capacity can quickly lead to a deterioration of the buckets because of overtemperaturing.

It is, therefore, an object of the invention to eliminate one of the prime causes for cooling inefficiency and more specifically to provide means for preventing, or at least minimizing the possibility of dirt or other foreign matter from clogging cooling passageways provided in turbine buckets as a cooling means so that volume of cooling air flow and the heat transfer coefficient of such passageways will be maintained constant for extended periods of time under most, if not all, operating conditions. The criticality of these parameters will be appreciated from the fact that these cooling passageways are often .010 inch in diameter or even smaller.

As will be apparent from the above objects, the problem of overtemperaturing of turbine buckets has to a large extent been solved by providing means for directing pressurized cooling air through elongated radial passages in the buckets themselves. This cooling air is derived from the axial flow compressor conventionally forming a component of such engines. While means are frequently employed for removing larger particles of dirt, viz. liquid or solid foreign particles in general, from the air entering the compressor, nonetheless smaller particles remain in the cooling air even after it has traveled a considerable distance from the compressor to the turbine. Also there is the possibility of dirt originating from the engine itself becoming entrained in the cooling air. In this connection it should be noted that even particles of micron size can rather quickly reduce the air flow and heat transfer coefficient of such holes, which in many instances may result in critical overtemperaturing.

In attaining the ends of the present invention a turbine rotor construction of the type comprising two bucketed turbine wheels mounted in axially spaced relationship is employed. These wheels define a chamber in combination with cylindrical heat shield means extending therebetween adjacent the peripheries thereof. Pressurized cooling air is introduced into this chamber so that it and any particles entrained therein rotate at a high rate. This induced rotation is preferably attained by introducing the cooling air into the chambers through longitudinally extending holes in the first turbine wheel and also by maintaining a low flow rate through the chamber. Passageway means lead from this chamber to cooling holes in the turbine blades of the first wheel, the entrance to said passageway means being from a point spaced inwardly of the adjacent portion of the heat shield whereby particles entrained in the cooling air will be carried by centrifugal force past said passageway means without entering into the cooling holes in the turbine blade.

The passageway means from the pressurized chamber may further be, and preferably are, characterized by an annular plenum through which the cooling air is directed in a tortuous path to openings leading to the entrances of the cooling holes in the turbine buckets. This plenum is spaced radially outward from such holes so that very fine dirt particles which might remain entrained in the cooling air will be collected in the outer limits of the plenum, as the cooling air follows the tortuous path provided therefor.

The above and other related objects and features of the invention will be apparent from a reading of the following description of the disclosure found in the accompanying drawings and the novelty thereof pointed out in the appended claims. In the drawings:

FIG. 1 is a longitudinal section of a turbine rotor construction embodying the present invention;

FIG. 2 is a longitudinal section, on an enlarged scale, taken through the turbine rotor and through a blade attaching tang to show the cooling holes provided in the turbine bucket;

FIG. 3 is a section, on an enlarged scale, taken on line III—III in FIG. 1; and

FIG. 4 is a fragmentary perspective view, with portions in section, of the turbine rotor.

Referring to FIG. 1, the present turbine rotor comprises a first wheel 10 which is secured to the shaft (not shown) of a gas turbine engine. A second wheel 12 is mounted by and secured thereto by a flanged ring 14 through the use of bolts 16 and 18. The bolts 16 also secure an air seal 19 in place. Turbine buckets 20 are mounted in spaced relationship around the periphery of the wheel 10 and turbine buckets 22 are mounted in spaced relationship around the periphery of the wheel 12. The present turbine rotor is a so-called two stage turbine wherein the combustion gases first drive the buckets 20 and then pass through a stator or nozzle assembly 24 and then drive the second stage buckets 22. A heat shield 25 controls the flow of combustion gases from the first to the second stages.

The combustion gases passing through the buckets 20 are at extremely high temperatures, whereas the combustion gases passing through the stator assembly 24 and the second stage buckets 22 are at lesser temperatures because of the work which is expended in driving the first stage of the turbine. The first stage turbine buckets and sometimes the second stage buckets of a multi-stage turbine are therefore usually the only parts requiring the provision of cooling means, of the type described, to prevent overtemperaturing.

Each of the buckets 20 (FIG. 4) is provided at its base with a platform 26 and a corrugated dovetail tang 28 which is received in the correspondingly shaped slot 30 in the wheel 10. Clamping ring 32 and clamp flange 34 (integral with heat shield 25) are secured on opposite sides of the wheel 10 by bolts 36, which pass through extensions of the slots 30 in spaced relation, beneath the tangs 28, to secure the buckets to the turbine wheel. The buckets 22 are similarly secured to the wheel 12. Thus each bucket 22 has a corrugated dovetail tang 37 anchored in a corresponding slot. The heat shield 25 has a second integral flange 39 which in combination with a clamping ring 41, secured by bolts 43, holds the buckets 22 in place.

Each of the buckets 20 have a plurality of lengthwise holes 38, radially of the wheel 10, which are of a relatively small diameter extending from the base of the tang 28 to the outer end thereof. Cooling air which is to be directed through the holes 38 is taken from the compressor (not shown) of the gas turbine engine and ducted to an annular chamber 40 (FIG. 1) from which it passes through holes 42 in the wheel 10 into a chamber 44 which is defined by the wheels 10 and 12, the connecting or torque ring 14 and the heat shield 25. The chamber 44 is thus pressurized and air then passes through holes 46 (FIG. 4) in the flange 34 to enter a secondary plenum chamber 48 formed by a circumferential groove in the radial face of the clamping ring 34. Clearance is provided at the base of each of the tangs 28 to permit the cooling air to pass from the plenum chamber 48 to the holes 38.

Air and any foreign matter therein is induced to a high rotational velocity as it passes through the chamber 44, providing a centrifugal force which causes the heavier dirt particles to be thrown outwardly by centrifugal force into the relieved portion 50 (FIG. 2) of the heat shield 25, which is radially outward of the entrances to holes 46. The arrangement effectively acts as a dirt separator so that the air passing through the holes 46 is substantially free of dirt particles which might clog the holes 38. This induced rotation of the cooling air is to a large extent obtained by passing it through the axially extending holes 42 in introducing it into the chamber 44. There is also a relatively low flow rate through the chamber 44 which further increases the induced rotational velocity of the cooling air.

While the dirt separation obtained by the described configuration of the heat shield is highly effective, the plenum chamber 48 further insures that air entering the cooling holes 38 will be dirt free. Thus it will be noted that the holes 46 (FIG. 4) are angularly offset from the tang receiving grooves 30. Therefore, as air passes through the holes 46 into the chamber 48, it must flow in a lateral and then inward path to reach the bases of the tangs 28 and the openings to the cooling holes 38. In following this tortuous flow path the centrifugal effect on any dirt particles which have remained entrapped in the air is even more pronounced, and the dirt is forced to the outer surface of the chamber 48 (FIG. 2) where it is trapped in a pocket spaced outwardly of the bases of the tangs 28. This secondary trap is particularly effective in eliminating micron size particles of dirt which is necessary in maintaining high cooling efficiency.

It will also be noted that the clamp ring 32 and flange 34 are provided with annular sealing surfaces 52, 54 (FIG. 4) respectively which engage the wheel 10 and overlie the lines of engagement of outwardly facing surfaces on the tangs 28 and matching surfaces of the slots 30, indicated at x. As the wheel rotates, these tang surfaces are thrown by centrifugal force into firm sealing engagement with the opposed surfaces of the slots. By having the sealing surfaces 52, 54 engaging the wheel in these areas, leakage of the cooling air is effectively prevented.

Having thus described the invention, what is claimed as novel and desired to be secured by Letters Patent of the United States is:

1. In a multi-stage turbine rotor comprising,
first and second axially spaced wheels having turbine buckets spaced around their peripheries,
the buckets of said first wheel having radial cooling holes therethrough,
heat shield means extending between said wheels adjacent the peripheries thereof,
a ring, spaced inwardly of the heat shield means, connecting the two wheels,
the buckets of said first wheel having corrugated tangs and said first wheel having correspondingly formed slots lockingly receiving said tangs in a radial sense,
said heat shield means comprising a flange clamped against the radial face of said wheel, marginally of its periphery, to provide, at least in part, means for axially clamping said tangs in said slots,
a plurality of axially extending holes through said first wheel for introducing pressurized cooling air into said annular chamber and inducing it to rotate at a high velocity,
passageway means extending through said flange from said annular chamber to the holes of said buckets,
the entrance to said passageway means being spaced radially inwardly from the adjacent portion of said heat shield means,
whereby when the turbine rotor is rotating at a high speed in normal operation, dirt entrained in the air within said annular chamber will be thrown past the entrance to said passageway means and collected against the heat shield means spaced radially outwardly therefrom.

2. In a multi-stage turbine rotor comprising,
first and second axially spaced wheels having turbine buckets spaced around their peripheries,
the buckets of said first wheel having radial cooling holes therethrough,
heat shield means extending between said wheels adjacent the peripheries thereof,
a ring, spaced inwardly of the heat shield means, connecting the two wheels,
the buckets of said first wheel having corrugated tangs and said first wheel having correspondingly formed slots lockingly receiving said tangs in a radial sense,
said heat shield means comprising a flange clamped against the radial face of said wheel, marginally of its periphery, to provide, at least in part, means for axially clamping said tangs in said slots,
a plurality of axially extending holes through said first wheel for introducing pressurized cooling air into said annular chamber and inducing it to rotate at a high velocity,
passageway means extending through said flange from said annular chamber to the holes of said buckets,
said passageway means comprising a groove formed in the radial face of said flange, forming in combination with said wheel an annular plenum chamber,
a plurality of holes extending through said flange in angularly offset relation to said tang receiving slots,
said plenum chamber extending from a point radially outward the bases of said tangs to a point radially inwardly thereof, providing for a flow path for air from said plenum chamber to the entrance to said cooling holes,
the entrance to the holes through said flange being spaced radially inwardly of the adjacent portion of said heat shield means,
whereby when the turbine rotor is rotating at a high speed in normal operation, dirt entrained in the air within said annular chamber will be thrown past the entrance to said passageway means and collected against the adjacent heat shield portion and air passing from said holes in the flange to the holes in the turbine bucket will follow a tortuous path through said plenum chamber and any further dirt remaining entrained in the air will be thrown against the outer extent of said plenum chamber and collected therein.

3. The combination of claim 2 wherein,
a bearing surface is formed on said flange marginally and radially outwardly thereof,
said bearing surface overlying the corrugated portions of said tangs at radially outwardly facing portions thereof which are loaded by centrifugal force as the turbine wheel rotates,
thereby forming an effective seal for the cooling air.

References Cited

UNITED STATES PATENTS

| | | |
|---|---|---|
| 2,632,626 | 3/1953 | McClintock. |
| 2,656,147 | 10/1953 | Brownhill et al. ____ 253—39.15 |
| 2,859,935 | 11/1958 | Roesch _____ 253—39.1 X |
| 2,860,851 | 11/1958 | Halford et al. _____ 253—39.15 |
| 2,996,280 | 8/1961 | Wilson. |

EVERETTE A. POWELL, Jr., *Primary Examiner.*

SAMUEL FEINBERG, *Examiner.*